April 25, 1933.  E. J. COLE  1,905,621
METHOD OF PRODUCING SELF LOCKING NUTS
Original Filed Oct. 28, 1930
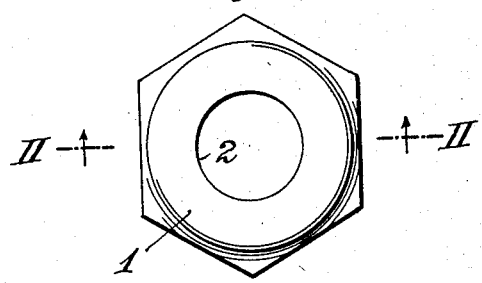
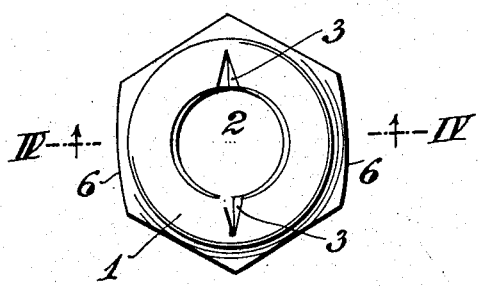
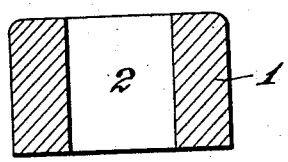
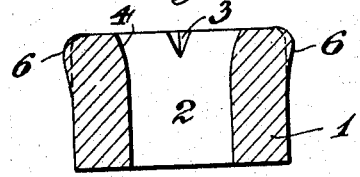
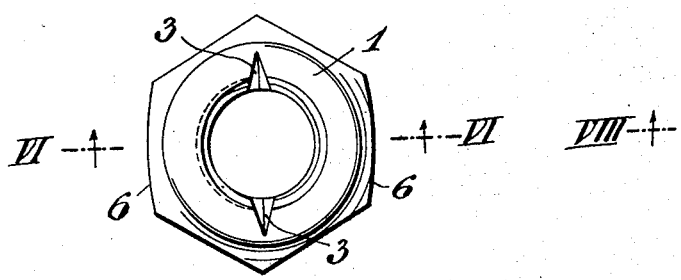
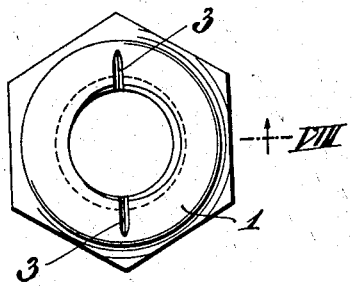
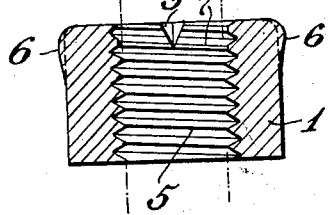
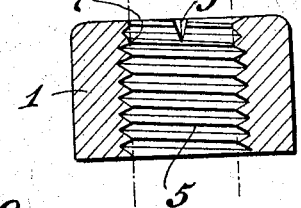
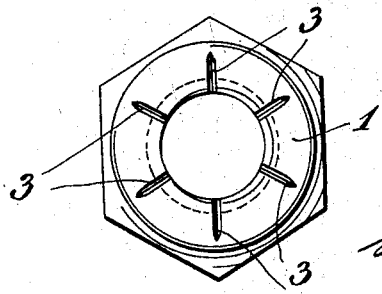
INVENTOR
Edward J Cole
BY
[signature]
ATTORNEYS Patented Apr. 25, 1933

1,905,621

UNITED STATES PATENT OFFICE

EDWARD J. COLE, OF PEEKSKILL, NEW YORK, ASSIGNOR, BY MESNE ASSIGNMENTS, TO HELEN MARGARET COLE, OF PEEKSVILLE, NEW YORK

METHOD OF PRODUCING SELF-LOCKING NUTS

Original application filed October 28, 1930, Serial No. 491,686. Divided and this application filed September 30, 1931. Serial No. 566,041.

My present invention is directed to the method of producing the self-locking nut which forms the subject matter of my co-pending application filed October 28th, 1930, Serial No. 491,686, of which this application is a division.

In the accompanying drawing:

Fig. 1 represents in top plan a nut blank of standard dimensions having an unthreaded bore therethrough;

Fig. 2 represents a cross section taken in the plane of the line II—II of Fig. 1, looking in the direction of the arrows;

Fig. 3 represents a plan view of the nut blank after one end portion of the blank and the corresponding end portion of the bore have been spread by a suitable tool which has divided and separated the metal at the intersection of the bore and end of the blank by a wedging action;

Fig. 4 represents a section taken in the plane of the line IV—IV of Fig. 3, looking in the direction of the arrows;

Fig. 5 represents a top plan view of the nut after its bore with its spread divided end portion has been screw threaded.

Fig. 6 represents a section taken in the plane of the line VI—VI of Fig. 5, looking in the direction of the arrows;

Fig. 7 represents in top plan the nut after the sides of the nut and the spread divided end portions of the threaded bore have been compressed laterally to bring them back to their normal contours;

Fig. 8 represents a section taken in the plane of the line VIII—VIII of Fig. 7; and Fig. 9 represents in top plan a nut of slightly modified form in that its end portion is divided at its bore by three pairs of diametrically opposed recesses.

The method by which my self-locking nut of standard dimensions is produced, is as follows:

A nut blank 1 of standard dimensions having an unthreaded bore 2 therethrough as shown in Figs. 1 and 2 is subjected at one end to the action of a suitable tool (not shown herein) which divides and separates the metal at the intersection of the bore with one end of the nut blank as shown in Figs. 3 and 4. This operation forms diametrically opposed recesses 3, 3, in the present instance V-shaped in cross section, without removing any of the metal of the nut blank, which removal would tend to weaken the nut. This division and separation of the metal is preferably along a major diameter of the nut, i. e., along a line between two diametrically opposed apices formed by adjacent meeting sides of the nut blank, thereby further eliminating the possibility of unduly weakening the nut blank. In Figs. 1 to 8 inclusive I have shown one pair of these diametrically opposed recesses while in Fig. 9, I have shown three pairs of such recesses, it being understood that any number of recesses may be formed as required for particular purposes.

This division and separation with its consequent displacement of the metal of the nut blank causes the corresponding ends of the bore and sides of the nut blank to spread or expand outwardly forming a slight flare 4 in the bore and spread portions 6, 6 on the sides of the blank.

The nut blank in this condition with its flared bore 4 is subjected to the action of a screw tap for threading the bore as shown in Figs. 5 and 6, it being obvious that the threaded portion 5 will be of the same depth along the unflared portion of the bore and the threaded portion 7 of gradually lessening depth along the flared portion of the bore, the outer diameters of the two threaded portions being the same.

The final step in the production of the nut is illustrated in Figs. 7 and 8 where the nut is subjected to the action of a power press which will compress the spread portions 6, 6 of the sides of the nut and bring them back to their normal contour. This lateral compression at the same time contracts the sides of the recesses 3, 3 and brings back the spread portion of the threaded bore to its normal condition so that the inner diameters of the threaded portions 7 and 5 will be substantially the same.

From the above description it will be seen that my improved method produces a standard nut with a standard thread cut therein, which nut has a divided portion at one end of its threaded bore having its threads of lesser depth than the remaining threads; said divided portion being surrounded by an undivided portion whereby the strength of the nut is maintained. It will also be observed that the threaded bore at its divided portion has its threads of less depth than the remaining threads of the bore because of the tapping of the thread while the divided portion of the bore was in its spread or flared condition.

Because of the lesser depth of the threads of the bore at the divided portion of the nut and because the inner diameter of this threaded portion is brought into substantial correspondence with the inner diameter of the remaining threaded portion; this divided portion of the nut will exert a gripping action on the bolt, when engaged thereby because of the inability of the threaded portion of the bolt to normally pass through said threads of lesser depth in the bore of the nut at this point.

It will also be seen that by forming the recesses along the major diameter of the nut the tendency of the recesses to weaken the nut is materially lessened. This tendency is further lessened by the dividing and separating and consequent displacement of the metal of the nut blank rather than by removing the metal therefrom.

What I claim is:

1. The method of producing a self-locking nut which consists in dividing and separating the metal of the nut blank at one end of its unthreaded bore within the periphery of the blank to laterally spread the end of the bore and certain side portions of the blank, screw threading the bore and thereby forming threads of lesser depth at the divided and spread end of the bore, and finally compressing the spread side portions of the blank and consequently the divided and spread end of the bore.

2. The method of producing a self-locking nut which consists in dividing and separating the metal of the nut blank at one end of its unthreaded bore within the periphery of the blank to laterally spread the end of the bore and certain side portions of the blank, screw threading the bore and thereby forming threads of lesser depth at the divided and spread end of the bore, and finally compressing the spread side portions of the blank and consequently the divided and spread end of the bore sufficiently to bring the inner diameter of the threads at said divided end of the bore to substantially the same diameter as the inner diameter of the remaining threads.

In testimony, that I claim the foregoing as my invention, I have signed my name this 23rd day of September, 1931.

EDWARD J. COLE.